(12) United States Patent
Bandeira et al.

(10) Patent No.: US 6,728,514 B2
(45) Date of Patent: Apr. 27, 2004

(54) SCALABLE WIRELESS NETWORK TOPOLOGY SYSTEMS AND METHODS

(75) Inventors: Nuno Bandeira, Goleta, CA (US); Lars Poulsen, Santa Barbara, CA (US)

(73) Assignee: Wi-Lan Inc., Calgary (CA)

( * ) Notice: Subject to any disclaimer, the term of this patent is extended or adjusted under 35 U.S.C. 154(b) by 281 days.

(21) Appl. No.: 09/736,642

(22) Filed: Dec. 13, 2000

(65) Prior Publication Data

US 2002/0072329 A1 Jun. 13, 2002

Related U.S. Application Data (60) Provisional application No. 60/231,253, filed on Sep. 8, 2000.

(51) Int. Cl.[7] .................................................. H04Q 7/20
(52) U.S. Cl. ...................... 455/13.1; 455/11.1; 455/428; 455/429; 455/446
(58) Field of Search ................................ 455/305, 306, 455/423–425, 446, 457, 63, 11.1, 25, 13.1, 428–429

(56) References Cited

U.S. PATENT DOCUMENTS

| | | | | |
|---|---|---|---|---|
| 5,117,430 A | * | 5/1992 | Berglund | 370/85.1 |
| 5,867,109 A | * | 2/1999 | Wiedeman | 340/827 |
| 6,018,659 A | * | 1/2000 | Ayyagari | 455/431 |
| 6,414,955 B1 | * | 7/2002 | Clare | 370/390 |

* cited by examiner

*Primary Examiner*—William Trost
*Assistant Examiner*—Brandon J Miller
(74) *Attorney, Agent, or Firm*—MacPherson Kwok Chen & Heid LLP; Greg J. Michelson (57) ABSTRACT

Wireless broadband data access is provided to and from a plurality of locations distributed randomly over a large geographic area. The network can be deployed one node at a time, with a new node incorporated into the network if within radio frequency range of any existing node in the network. The newly incorporated node can then be the attaching point for another new node that requires incorporation into the network. Data can be forwarded over multiple hops to reach its destination in the network, with the data-polling scheme self-synchronizing with minimal transmission overhead.

34 Claims, 8 Drawing Sheets

SCALABLE WIRELESS NETWORK TOPOLOGY SYSTEMS AND METHODS

CROSS-REFERENCE TO RELATED APPLICATIONS

This application claims the benefit of U.S. Provisional Application No. 60/231,253, filed Sep. 8, 2000, which is incorporated herein by reference in its entirety.

BACKGROUND OF THE INVENTION

1. Field of the Invention

The present invention relates generally to communication systems and, more particularly, to wireless broadband communication networks and methods for data transmission and reception.

2. Related Art

There is an increasing demand for interconnecting a plurality of remote locations spread over a large geographic area to provide broadband data communication services to those locations. The objective of many of these types of systems is to transfer large amounts of data, voice, or video between the various remote locations and a central location, which provides a gateway to a larger network, such as, for example, the Internet. Alternatively, for example, many of these types of systems can be used for private networks where the end-to-end transfer of data takes place between any of the two remote locations.

Current solutions for such networks include both wired and wireless approaches. If a wired network does not already exist or is otherwise inadequate to provide the required broadband service, then a wireless approach has many advantages. In general, wireless solutions are easier and quicker to install and, therefore, are significantly less expensive.

As an example, one wireless network solution to the problem provides point-to-point wireless connectivity to all the remote locations. This approach requires many locations to be equipped with multiple transceivers, each one connected to a different directional antenna. At those sites, a router or multiplexer may also be required to provide switching capability between the several point-to-point links. This approach is both costly and under utilizes the radio frequency (RF) bandwidth. Data applications are characterized by sudden bursts of high-speed communications followed by long idle times. The point-to-point links therefore need to be designed to support the high data rate required for the burst, but will otherwise be idle at other times.

Another wireless access solution, for example, is based on a point-to-multipoint topology consisting of a central base station with the capability of handling communications with a plurality of subscriber stations. These point-to-multipoint systems use various medium access mechanisms to coordinate how the subscribers are all served by a single base station. These may include Time Division Multiple Access (TDMA), Frequency Division Multiple Access (FDMA), and Code Division Multiple Access (CDMA). The base station, having direct access to all the subscribers, provides centralized control to perform bandwidth sharing and allocation between the subscribers.

The geographic coverage of a single point-to-multipoint system is limited by the range of the radio equipment and line-of-sight (LOS) limitations. When the required geographic coverage exceeds the RF range of the equipment, these systems require multiple neighboring base stations, each at the center of a "cell." Within each cell, subscriber stations communicate with the base station that is nearest to them. The cells are ideally distributed on a honeycomb grid with the base stations at the center of each hexagon.

Deployment of cell-based systems generally encounter many difficulties. For example, traffic is concentrated at the various base stations, but still needs to be carried to a single central point through an additional backbone network. This backbone needs to be deployed with the maximum capacity envisioned, even though, at the early stages of deployment, it will be greatly underutilized. This represents an up-front expense before the service comes online.

Additionally, topographical features will shadow or block areas resulting in inadequate or a total loss of coverage. Studies have shown that in a cell-based system, up to thirty percent of potential subscribers may not be reached due to LOS limitations. This percentage can be reduced using mini-cells to cover some dark areas (i.e., uncovered areas); however, the additional base stations and the associated backbone connections add to the cost and complexity of the cell-based system.

A third wireless access solution, for example, is based on a multipoint-to-multipoint or mesh topology. In this approach, each station is equipped with an omnidirectional antenna and must be within RF reach of other stations in the network. The transceivers transmit to and receive from their direct neighbors and forward packets to their various destinations using any one of many possible routes. This approach does not require a backbone and can easily reach hidden locations through multiple hops.

The multipoint-to-multipoint approach, however, has many drawbacks. For example, to establish connectivity to more than one neighbor, the radio antenna will typically be an omnidirectional or sector antenna (as opposed to the directional antenna used by the subscriber stations in a point-to-multipoint system). This reduces the link distance that can be achieved between any two points and exposes the receiver to noise and interference from all directions.

Another drawback is that each radio station may have a large number of neighbors that can be reached with one hop. This is indeed the advantage of the mesh network—provide multiple alternate routes between any two points. However, the transmissions from any given radio will reach not only the intended receiver, but also all of the neighboring receivers. Thus, the number of possible simultaneous transmissions by neighboring radios must be greatly reduced in order to avoid collisions.

An additional drawback is that, due to the possibility of collisions (as discussed above), all of the radio stations need to coordinate their transmission times with neighboring radio stations without the help of a central site. This must be done with over-the-air messages, which further reduces the airtime available for actual data transmissions.

As a result, there is a need for a wireless communication network system and method that overcomes some of the limitations of the prior art, such as, for example, those discussed for a cell-based point-to-multipoint system or for a mesh multipoint-to-multipoint topology.

BRIEF SUMMARY OF THE INVENTION

In accordance with some embodiments of the present invention, scalable network topologies and access methods (e.g., medium access control) using frequency, time, and directional diversity are provided. Wireless broadband data access is provided to and from a plurality of locations distributed randomly over a large geographic area. Various network topologies and access methods are provided, which allow numerous transmitting instruments to co-exist without loss of the communication link or information (e.g., data packets) due to collisions or conflicts within the network or system.

Embodiments of the present invention may include, for example, an apparatus and method that facilitates the deployment of a RF wireless network having many advantageous characteristics. As an example, the network can be deployed one node at a time without requiring base stations. A new node can become part of an existing network by simply being placed within RF reach of any other node already in the network. In addition, once the new node is part of the network, the new node can become the attaching point for other new nodes.

Furthermore, in accordance with some embodiments of the present invention, network nodes only require two independent communication channels and may combine the use of frequency and directional diversity to allow multiple nodes to transmit simultaneously in the same geographical area without collisions. The network does not require a backbone to be deployed, with all traffic capable of being forwarded by the wireless apparatus, through multiple hops, if necessary, to reach its intended destination. Backbone point-to-point links can be added at a later time to scale-up the network, if desired, but are not needed until the total available capacity has been utilized. An additional advantage is that the apparatus deployed at each subscriber location, for example, may be identical for all locations (e.g., no hub or base station equipment is required). Furthermore, in accordance with some embodiments of the present invention, the medium-access method self-synchronizes all of the nodes in the network with no overhead or dedicated synchronization transmissions.

In accordance with one embodiment of the present invention, a wireless communications network is provided that includes a plurality of locations, each having a transceiver adapted to transmit or receive a radio frequency signal by selecting a channel from at least two non-conflicting channels and further adapted to connect to two distinct antennas. One of the locations is designated a root node and the other locations are designated as non-root nodes, with each non-root node within radio frequency range of either the root node or another non-root node. A tree structure is formed that originates at the root node and branches out from the root node to one or more of the non-root nodes, with the locations not within radio frequency range of the root node communicating with the root node through non-root nodes that function as repeaters. The repeaters are designated as parents and the non-root nodes that communicate with the repeaters are designated as children for each level of the tree structure. A broadbeam antenna is connected to the transceiver of the root and parent nodes to transmit or receive wireless communications with the non-root nodes that are within radio frequency range of the root or parent nodes. A directional antenna is connected to the transceivers of the non-root nodes to transmit or receive wireless communications with the root or parent node.

In accordance with another embodiment of the present invention, a method of communicating in a wireless communications network is provided, with the network comprised of a root node and at least one repeater node and one leaf node. The root node has an antenna for wireless communication with its slaves while the repeater nodes and the leaf nodes have only one master and have a directional antenna pointed at the respective master. The repeater nodes have an additional antenna for wireless communication with their slaves when functioning as masters. The method performed by each root, repeater, and leaf node comprises determining the node type; performing a master cycle repeatedly if the node is the root node; performing an attach cycle if unattached or becomes detached from the network and if the node is not the root; and performing a slave cycle followed by the master cycle, repeatedly, if the node is not the root.

A more complete understanding of embodiments of the present invention for network topology systems and methods will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

Figure 1:
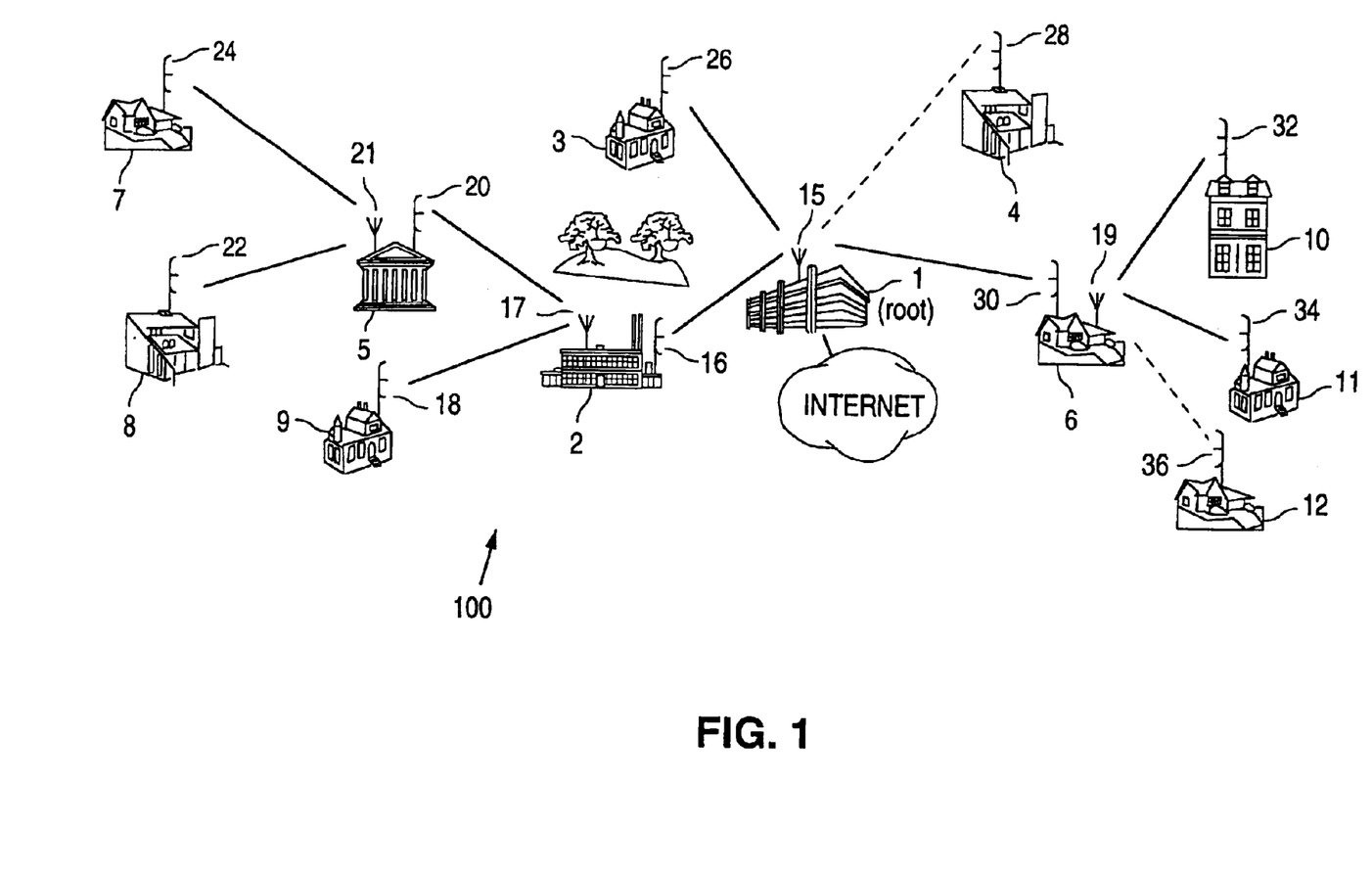
FIG. 1 shows a block diagram illustrating an exemplary network topology in accordance with an embodiment of the present invention.

FIG. 1 shows a block diagram illustrating an exemplary network topology 100 in accordance with an embodiment of the present invention. Network topology 100 includes a wireless network having a number of locations 1 through 12 (also referred to herein as nodes, sites, or stations) that may be fixed or mobile.

Locations 1 through 12 each include a wireless transceiver (not shown, but an exemplary embodiment is described in more detail below in reference to FIG. 6) that is capable of either transmitting or receiving at any given time on an appropriate RF band. The wireless transceiver (also referred to herein as a transceiver) is capable of quickly switching between transmit and receive modes and, once in receive mode, the wireless transceiver is capable of acquiring a transmission (e.g., a burst transmission) from a remote transceiver at another location with minimal communication information overhead. Under software control (as described in detail below in reference to FIGS. 6–10), the transceiver can transmit or receive in at least two different non-conflicting channels. In addition, each transceiver contains at least three ports: one port for interfacing with the subscriber's equipment (e.g., a customer's equipment at the location) and two RF ports, designated as A and B, available for connection to two distinct antennas. The RF ports are switched under software control (as described in detail below in reference to FIGS. 6–10) so that the receiver or transmitter circuitry is connected to only one of the antennas at a time.

It should be understood that network topology 100 may include as few as two locations or as many locations as required. For example, network topology 100 may include a central site (also referred to herein as a root of the network), such as location 1, and a subscriber site, such as location 2. The wireless transceiver at location 1 is installed with an omnidirectional antenna 15 connected to port B (not shown). At location 2, the wireless transceiver is installed with a directional antenna 16, connected to port A (not shown), pointing at location 1. However, it should be understood that any type of antenna may be connected to port B that is suitable, under the conditions, for establishing a wireless communication link with the desired locations. Also, as shown in FIG. 1, location 1 (or any other location in the network as discussed in reference to FIG. 6) may be further connected to a network, such as the Internet, for example, to provide a communication link between the Internet and the various locations of network topology 100.

Network topology 100, for the above example, may expand by adding additional locations (i.e., subscribers), such as locations 3 and 4, if locations 3 and 4 are within RF range of location 1. Locations 3 and 4 are introduced into network topology 100 in a similar fashion as location 2—i.e., using directional antennas 26 and 28 connected to port A of respective locations 3 and 4 and pointing at location 1. Additionally, network topology 100, for the above example, may expand by adding additional locations, such as location 5 that is not within RF range of location 1, by interfacing with any other location, such as location 2, that is already part of network topology 100. Thus, location 2 serves as a relay (i.e., a repeater) for location 5 to ultimately connect location 5 with location 1.

In accordance with an embodiment of the present invention, any node or location already in the network can be used as a relay point to reach the central site (i.e., location 1). Consequently, because location 5 is within RF range of location 2, in the above example, location 2 will start functioning as a "repeater" for location 5 in order for location 5 to reach location 1. An omnidirectional antenna 17, for example, may be installed at port B of location 2 to receive the transmission from location 5 that has a wireless transceiver that transmits through directional antenna 20 pointing at location 2. This differs significantly from conventional systems, such as a cell-based network, which would require a new base station at the center of a new cell, along with a backbone connection between the new base station and the current base station in order to add an additional location, such as location 5.

As network topology 100 expands by adding additional locations, for example, any location within network topology 100 can be promoted to become a repeater by simply attaching an omnidirectional antenna, for example, to port B. Alternatively, depending upon the directional requirements of the locations, a directional antenna or a sector antenna, which may also be polarized, for example, may be connected to port B. The basic requirement for a new location to be incorporated into network topology 100 is that it must be within RF range of another location already incorporated into network topology 100.

As shown in FIG. 1, location 1 serves as a central site or root for network topology 100. Locations 2, 3, 4, and 6 directly communicate with location 1, with locations 3 and 4 comprising discrete locations and having respective directional antennas 26 and 28 connected to port A of the wireless transceivers at locations 3 and 4, and pointing at omnidirectional antenna 15 of location 1. Locations 2 and 6 serve as repeaters, with location 2 linking locations 5 and 9 to location 1 and location 6 linking locations 10, 11, and 12 to location 1. Locations 9–12 have respective directional antennas 18, 32, 34, and 36 pointing at their corresponding repeaters, which link them to location 1. Location 5 links locations 7 and 8 to location 2 and ultimately to location 1 by receiving transmissions from directional antennas 24 and 22, respectively, of locations 7 and 8 through omnidirectional antenna 21 of location 5.

Figure 2:
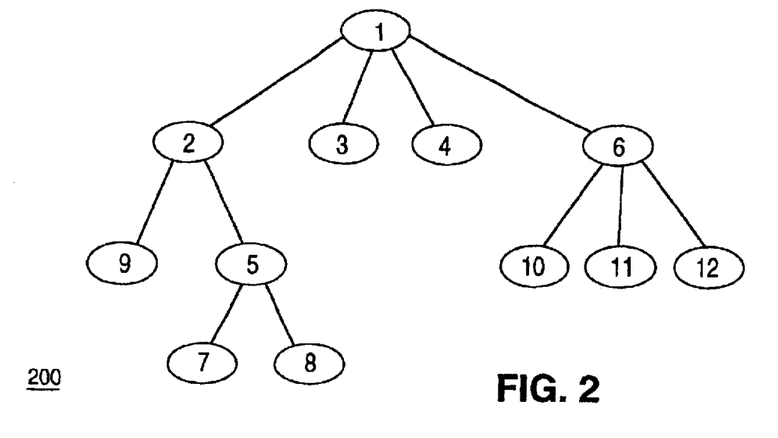
FIG. 2 shows a network graph representation corresponding to the exemplary network topology of FIG. 1.

This network deployment strategy builds a natural "tree" topology as can be seen in FIG. 1 and illustrated in graphical form in FIG. 2, which shows a network graph 200 representation corresponding to the exemplary network topology 100 of FIG. 1. Network graph 200 illustrates the network structure of network topology 100, with location 1 forming the root or central site to which the remaining locations ultimately communicate with. Locations 2, 3, 4, and 6 communicate directly with location 1. Location 2 serves as a repeater for locations 5 and 9, with location 5 serving as a repeater for locations 7 and 8. Location 6 serves as a repeater for locations 10–12. As shown, the most distant nodes in network topology 100, as illustrated in network graph 200, are locations 7 and 8 that each communicate through locations 5 and 2 to reach location 1. However, network topology 100 may be further expanded as required.

In general, the wireless transceiver at the root (e.g., location 1) may be configured as a root while all other nodes (e.g., locations 2–12) may be configured as repeaters. Each wireless transceiver in the network operates in a half-duplex mode, i.e., it may either transmit or receive at any given time. For example, transmissions may consist of variable length packets. "Outbound" packets flow "downstream" or away from the root node. "Inbound" packets flow "upstream" or towards the root.

Each node in the network, with the exception of the root, has one and only one "parent" node, which is the node closer to the root and through which the node communicates to reach the root. For example, location 2 in FIG. 2 is the parent node to locations 5 and 9. Antenna port A in each transceiver is assigned for communications with that node's parent. That antenna is generally a high gain directional antenna pointing to the location of its parent.

Antenna port B is assigned for communications with the node's "children" nodes, which are the nodes farther away from the root and that communicate with the node in order to eventually reach the root. For example, locations 5 and 9 are the children nodes of location 2, which is the parent node for locations 5 and 9. The antenna for antenna port B must provide coverage to all of the node's children. Depending on the geographic location of those children, the antenna connected to port B could be, for example, an omnidirectional, sector, or narrow directional antenna. Nodes that have no children do not require an antenna connected to port B.

Outbound and inbound transmissions are assigned to two non-overlapping "channels". In accordance with an embodiment of the present invention, this non-overlapping requirement is achieved by operation in two distinct frequencies. However, any other form of separation, such as different codes in a CDMA system, for example, would be adequate.

With this topology, a transmission within any given "branch" (defined as a parent transceiver together with its one-hop children) will not interfere with simultaneous transmissions in any other branches. Any two simultaneous outbound transmissions will be received by the intended nodes due to the high gain antenna in the receivers. Similarly, any two simultaneous inbound transmissions will be received by the intended upstream nodes due to the high gain antenna in the transmitters. This scheme is further optimized by having all transceivers control their output power to achieve no more than the adequate link margin for that particular transmission.

The exemplary network topology 100 in FIG. 1 can illustrate why the inbound and outbound transmissions need to be on different channels. For example, location 6 may perform an outbound transmission (when functioning as a repeater) through an omnidirectional antenna, at the same time as location 3 transmits an inbound transmission to location 1 (i.e., the root). If the inbound and outbound were on the same channel, there would be a collision or interference at location 1 due to location 6 and location 3 transmitting at the same time.

There may be specific situations where the diversity achieved through the dual channel operation and antenna directivity would not work. For example, if locations 2, 5, and 7 were in a straight line, inbound transmissions from location 7 to location 5 could reach location 2 and interfere with a simultaneous inbound transmission from location 9. Those specific cases can be addressed with one or more techniques discussed herein. For example, power management techniques can be exploited, such as reducing or controlling the transmit power of a given location. For example, the transmit power of location 7 may be reduced so that its transmitted signal received at location 2 is significantly below the transmitted signal received from location 9.

Another technique is to add additional channels. For example, a "primary" set of channels is used between location 2 and its children and a "secondary" set of channels are used between location 5 and its children. An additional technique is to employ antenna polarization. For example, a horizontal antenna polarization is used between location 5 and its children, while vertical polarized antennas are used for communication between location 2 and its children.

Figure 3:
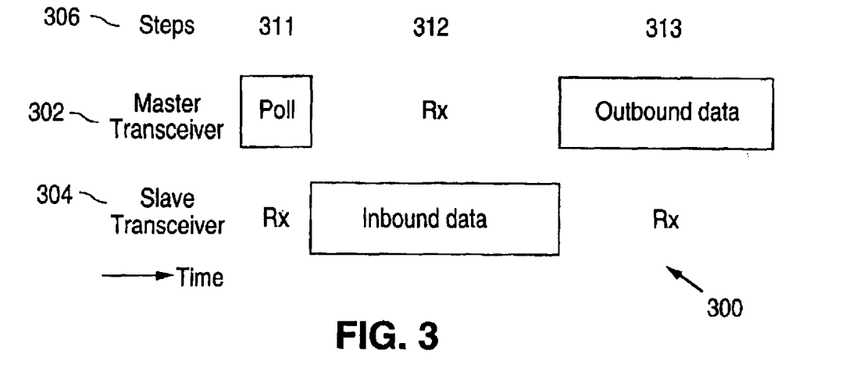
FIG. 3 shows a timing diagram of a polling cycle between a master station and a slave station in accordance with an embodiment of the present invention.

Within each "branch" (e.g., a branch includes the parent and its children nodes), collisions are avoided, for example, by using a polling scheme that takes advantage of time diversity. The parent transceiver (of a parent node) works as a "master" and all of its one-hop children transceivers (of children nodes) work as "slaves." FIG. 3 shows a timing diagram 300 of a polling cycle between a master transceiver 302 and a slave transceiver 304 in accordance with an embodiment of the present invention. The master transceiver 302 goes through a "polling cycle," polling all downstream transceivers (i.e., slaves such as slave transceiver 304) that are one hop away. Each poll consists of a number of steps 306, such as a three-step or three-phase transaction as illustrated in FIG. 3.

At step 311, master transceiver 302 sends a short poll message identifying slave transceiver 304 as the slave being polled, which is received ("Rx") by slave transceiver 304. Slave transceiver 304 replies immediately with all of its inbound data at step 312, which is received by master transceiver 302. The inbound data can include, for example, a stream of data or many variable size packets of data back to back. If there is no inbound data to communicate, slave transceiver 304 transmits a short "Poll Acknowledge" message (not shown).

After recognizing the end of the transmission from slave transceiver 304, master transceiver 302 sends all of its outbound data to slave transceiver 304 at step 313. For example, this may also include a stream of data or many packets of data back to back. If there is no outbound data, the master transmits an optional short "No Outbound Data" message (not shown).

After step 313, master transceiver 302 immediately polls the next slave transceiver on its list. Also, after step 311, if master transceiver 302 does not start receiving the reply from slave transceiver 304 within a very short time period (e.g., 500 microseconds), master transceiver 302 times out and starts polling the next slave (i.e., child).

Repeater nodes operate, at different times, as master or as slaves. As a master, the repeater node performs a single, full polling cycle, storing all of the collected data (e.g., data packets) that need to go further upstream. At the end of its polling cycle, the repeater node reverts to slave operation and waits for a polling message from its master. When the repeater node is polled, it transmits all of the upstream data collected in the previous cycle. At the end of the polling transaction, the repeater node reverts to master mode and initiates the next full polling cycle.

It is possible that when a master polls a repeater node, the repeater will not respond because it is busy performing its own polling cycle. In this case, the master simply moves on and polls its next slave (the timeout is very short). The repeater node will eventually complete its polling cycle and will respond when it is polled again by the master. This situation will be the exception, however, rather than the rule, because as the traffic converges towards the root, upstream nodes usually handle more traffic than downstream nodes. Therefore, the polling cycles of upstream masters will normally take longer than the polling cycles of the downstream slaves (i.e., repeater nodes). Also, because the downstream repeater node initiates its polling cycle right after it gets polled, it will typically complete its cycle before its master node completes its full cycle and polls the repeater node again. In other words, this polling scheme is self-synchronizing. Furthermore, the penalty of a repeater node not responding is negligible due to the short poll timeout period.

This polling and response protocol results in the network bandwidth being allocated "on demand" to the nodes that have the greatest demands or most active traffic. When a transceiver has no data to transmit or receive, the poll cycle is limited to two very short messages—a Data Poll sent by the master followed by the Poll Acknowledge sent back to the master by the slave. This leaves more time in the poll cycle for transmitting packets by the nodes that are active. Also, because data transactions, for example, may include or be solely burst-transmissions, this approach allows many nodes in the network to experience a high throughput when each generates a burst of data due to the unlikely event of many nodes attempting to send a burst transmission at the same time.

As the number of nodes in the network increase, however, the reduced throughput and traffic delays may become unacceptable. At that time, the overall throughput can easily be scaled up by splitting the original single network into two or more networks, each one with full capacity capability. This splitting of the original network can be done in several ways. For example, one option is to co-locate, at the root location, two or more transceivers, each one equipped with a sector antenna. Each one of these transceivers becomes the root of its own network. As an illustration in reference to FIG. 1, an additional node (e.g., location 13—not shown) can be located next to location 1 to serve as the root for location 2, while location 1 continues to serve as the root for locations 3, 4, and 6. In this example, the inbound and outbound channels on each of the separate networks may have to be different to avoid interference.

As an example, another option is to split an existing network into two by breaking an existing link and promoting or modifying a child in that link to become a root on a new network. For example, in FIG. 1, the link between nodes 1 and 2 could be broken and node 2 reconfigured as a root. Note that this can be done by simply reconfiguring node 2 as a root with no required hardware or antenna alignment modifications. A point-to-point "backbone" connection between node 1 and node 2 is now necessary. One advantage of an embodiment of the present invention, as compared to a cell-based network, is that this first backbone connection is only required once the traffic exceeds the network capacity rather than up-front when the network is first created.

Figure 4:
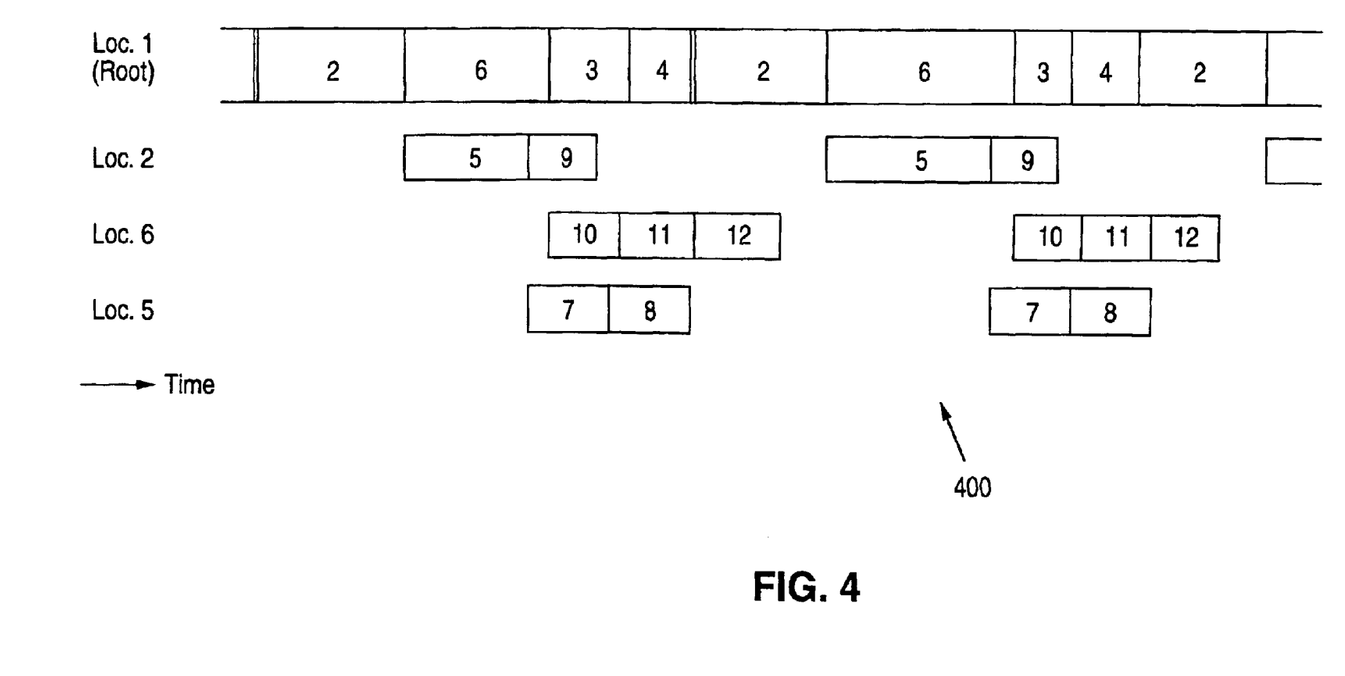
FIG. 4 shows a timing diagram of polling cycles corresponding to the exemplary network topology of FIG. 1.

FIG. 4 shows an exemplary timing diagram 400 of polling cycles corresponding to the network topology of FIG. 1. Timing diagram 400 illustrates a timeline for two consecutive polling cycles on network topology 100. Each block in FIG. 4 represents a complete three way transaction (discussed in reference to FIG. 3) between the parent (locations 1, 2, 5, and 6 which identifies a particular row of timing diagram 400) and the child identified in the corresponding block by location number.

As shown in timing diagram 400, location 1 (i.e., the root) polls location 2, which responds by transmitting to location 1 the inbound data and then receiving the outbound data from location 1 (as described above in reference to FIG. 3). Similarly, location 1 then polls, in a consecutive fashion, locations 6, 3, and 4, with inbound and outbound data being exchanged between these locations and location 1, prior to repeating this sequence starting with location 2. Location 2, after being polled by location 1, polls locations 5 and 9, with inbound and outbound data being exchanged between these locations and location 2. Similarly, after location 5 is polled by location 2, location 5 polls its children (i.e., locations 7 and 8) and after location 6 is polled by location 1, location 6 polls its children (i.e., locations 10, 11, and 12). As shown in FIG. 4, this entire sequence is then repeated in a consecutive temporal fashion, with data being exchanged between master and slave nodes as described above in reference to FIG. 3.

Timing diagram 400 illustrates an exemplary application where all of the traffic originates or converges at the root. This would be typical for an Internet Service Provider (ISP), with the root being the point of presence (POP). For this particular type of application, the following observations apply: 1) all traffic passes through the root, with the root node generally always busy; 2) repeaters will typically have some idle time, with the repeater "duty cycle" (ratio of its busy time over a complete poll cycle time) typically lower for repeaters further downstream; 3) outbound packets can travel through several levels of repeaters and reach their destination in a single poll cycle; and 4) inbound packets only go up one level per poll cycle, with the latency of the node increasing without reducing the available throughput of the node.

Figure 5:
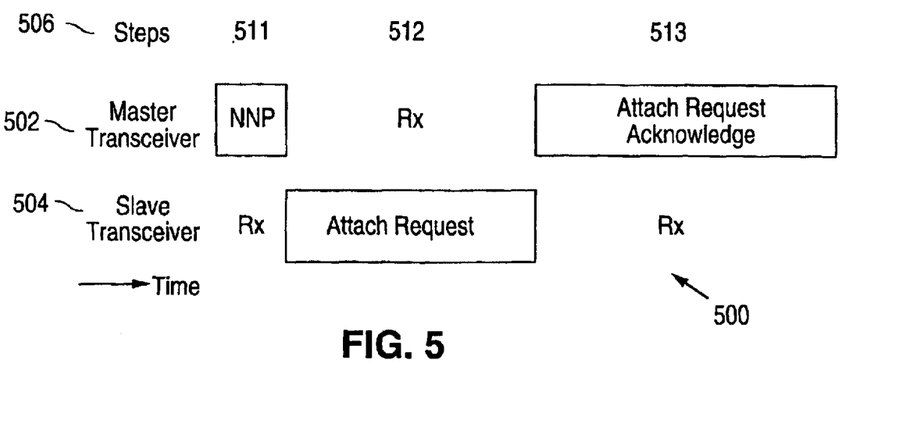
FIG. 5 shows a timing diagram of a new node polling cycle between a master station and a slave station in accordance with an embodiment of the present invention.

FIG. 5 shows an exemplary timing diagram 500 of a new node polling cycle between a master transceiver 502 (i.e., of a master station or node) and a slave transceiver 504 (i.e., of a slave station or node) in accordance with an embodiment of the present invention. As described above, a new node may be connected to the network by linking to any other node already connected to the network. The network, therefore, provides a self-configuration capability. The new node gets deployed by installing a transceiver at the subscriber location with its antenna A (i.e., the antenna connected to port A) pointing at any other node already in the network. The mechanism for this new node to get attached to the network is the "New Node Poll" (NNP) as exemplified in FIG. 5. This is a special poll, performed on a regular basis by radios (i.e., node transceivers) in master mode in order to identify any new nodes that desire to attach to the network.

Besides identifying any new nodes, the new node poll transaction is also used to negotiate the RF link parameters to use in future transactions for that specific link between nodes. Depending on the capabilities of the node transceivers, the RF link parameters may include such parameters as the transmit output power along with various modulation characteristics. For example, the NNP message, transmitted by the master node at regular intervals, is transmitted at the maximum RF power and using a default, robust, modulation scheme to provide the best opportunity of reception by any new node. The NNP may be performed every poll cycle or at some other interval, random or fixed, depending upon the circumstances.

When a new node is to be introduced into an existing network, the new node first monitors the outbound channel of an existing node in the network for broadcast of the NNP messages. The new node will typically monitor a few of these NNP message transmissions, without responding, in order to accurately measure its received signal strength (S). Immediately after the NNP message, the new node also determines the noise level in the outbound channel (N). Equipped with the Signal-to-Noise ratio (S/N), the new node determines the quality of the potential link with that parent. With this information, the new node can determine the optimum RF link parameters for this outbound link. The selection criteria is based on maximizing the data rate in the link with the lowest possible RF output power (from the master or parent node), while maintaining an adequate RF link margin.

Once the new node makes the selection of the optimum outbound RF link parameters, the new node prepares an "Attach Request" message. The new node (i.e., a slave transceiver 504) transmits this Attach Request message (at step 512 of FIG. 5) in response to the next NNP message (at step 511) from a master transceiver 502. This transmission is performed at the highest output power and using a default, robust, modulation scheme to increase the likelihood of reception by master transceiver 502. Upon reception, master transceiver 502 transmits back to slave transceiver 504, at step 513, an attach request acknowledgement.

A successful new node discovery transaction includes these three transmissions, which contain various information. For example, the NNP message includes the source address and the RF channel to be utilized for inbound transmissions to this master. The source address is unique for each node in the network and may be programmed at the factory during transceiver construction, for example. After transmitting the NNP message, the master configures itself to receive in the selected inbound channel and with the default RF link parameters. The attach request message is addressed to the master (i.e., to its provided source address) and transmitted in the inbound channel specified in the NNP message. The attach request message, for example, contains the source address, the RF Channel to be utilized for outbound transmissions to this slave, the RF link parameters for outbound transmissions to this slave, and the network identification.

The network identification (ID) is a parameter configured, for example, during installation of the node. The network ID is the same for every node in the network and is used to validate that the node requesting attachment to the network is a legitimate transceiver.

Every master node periodically measures the noise level (N) in the inbound channel when no slaves are transmitting. An appropriate time to perform this measurement would be immediately before it transmits the NNP message. When a master node receives an Attach Request message from a new node, the master node measures the received signal strength (S) of that message. Based on the Signal to Noise ratio (S/N) at the receive end of the link, the master node selects the optimum RF parameters for future inbound transmissions for this link. The selection criteria for this is the same as that determined by the slave for the outbound link (i.e., maximizing the data rate in the link with the lowest possible RF output power, from the slave or child node, while maintaining an adequate RF link margin). The master node then transmits an "Attach Request Acknowledge" (ARA) message (e.g., a data packet) that contains various information. For example, the ARA message includes the source address and the RF link parameters for inbound transmissions to this master node.

When the new node receives this ARA message, the new node considers itself "attached" to the master and will now be monitoring for its specific polls (for example, as described in the exemplary polling cycle in reference to FIG. 4) in the negotiated outbound channel and using the negotiated RF parameters. The master node, besides responding with the ARA packet, also creates an entry in its poll table for the new node. The entry includes the node address, the node channels, and the RF link parameters for both inbound and outbound communications with this new node. The master node will now start polling this new node during the regular poll cycle, because the new node is now incorporated into the polling cycle.

Each transceiver can be configured with a "Network ID" parameter, which must be the same in every node in the network. As described above, the Attach Request message (e.g., data packet) transmitted by the new node includes this Network ID. When the master node receives this message, the master node checks that the Network ID in the message matches its own Network ID. If the two IDs do not match, the master transmits an "Attach Request Denied" message instead of the "Attach Request Acknowledge" message. A new node that receives an "Attach Request Denied" message will not respond to further NNP messages for a limited time. This simple authentication mechanism prevents an unauthorized transceiver from attaching to the network.

The RF link parameters are optimized, as described above in reference to FIG. 5, during a successful new node discovery transaction. Having independent parameters for inbound and outbound directions allows those parameters to be optimized based on the local environment at the respective receiver. This is beneficial because the local environment conditions may be quite different at each end of the link. After the new node gets attached, the receivers at the end of each link continue to monitor the noise level and the signal level for the communications with each of its neighbors. If the Signal-to-Noise ratio changes significantly, the receiver may optimize the RF link parameters again to adapt to the changed conditions. This is done during the normal data poll cycle by including the new RF link parameters in the Data Poll packet (to change inbound link parameters) or the Poll Acknowledge packet (to change outbound link parameters).

During the various RF transactions described herein, there is always the possibility of some portion of a message being lost (e.g., a lost data packet), leaving different radios in incompatible states. The optimal solution will depend on the circumstances. For example, if during the new node discovery, the slave node does not receive the ARA message, the slave node assumes that there was a collision with another node trying to respond. The next time the slave node receives a new node poll, the slave node must decide whether to respond based on a probability "p". The value of this probability (which may default to 1 upon power-up) is halved every time that the new node responds but fails to get attached. This probability calculation, for example, may stop once the probability reaches $\frac{1}{16}$. This approach, instead of a random back-off, allows the master nodes to keep their time-outs following the transmission of the NNP message very short (e.g., 500 microseconds).

If the ARA message was transmitted by the master node but never received by the intended slave node, the master node will start polling the new slave node in the normal poll cycle, but the new slave node will still be waiting for a new node poll. In this case, the slave node will ignore the specific poll and continue to respond to the next NNP message. The master node must handle the situation where a node that the master node believes to be already attached, responds to the new node poll. For example, the master node can scan the addresses in the existing polling table for an entry with the same address as the new node. If the same entry is found in the polling table, the master node can reuse that entry instead of creating a new entry in the polling table.

Finally, if an attached node fails to get polled by its master node over a certain period of time (e.g., ten seconds), the slave node declares itself unattached and will start looking for the NNP messages again. Similarly, if a master node does not get a response from a slave node after a number of consecutive poll cycles (e.g., twenty poll cycles), the master node declares that slave node unattached and deletes the slave node from its polling table.

Figure 6:
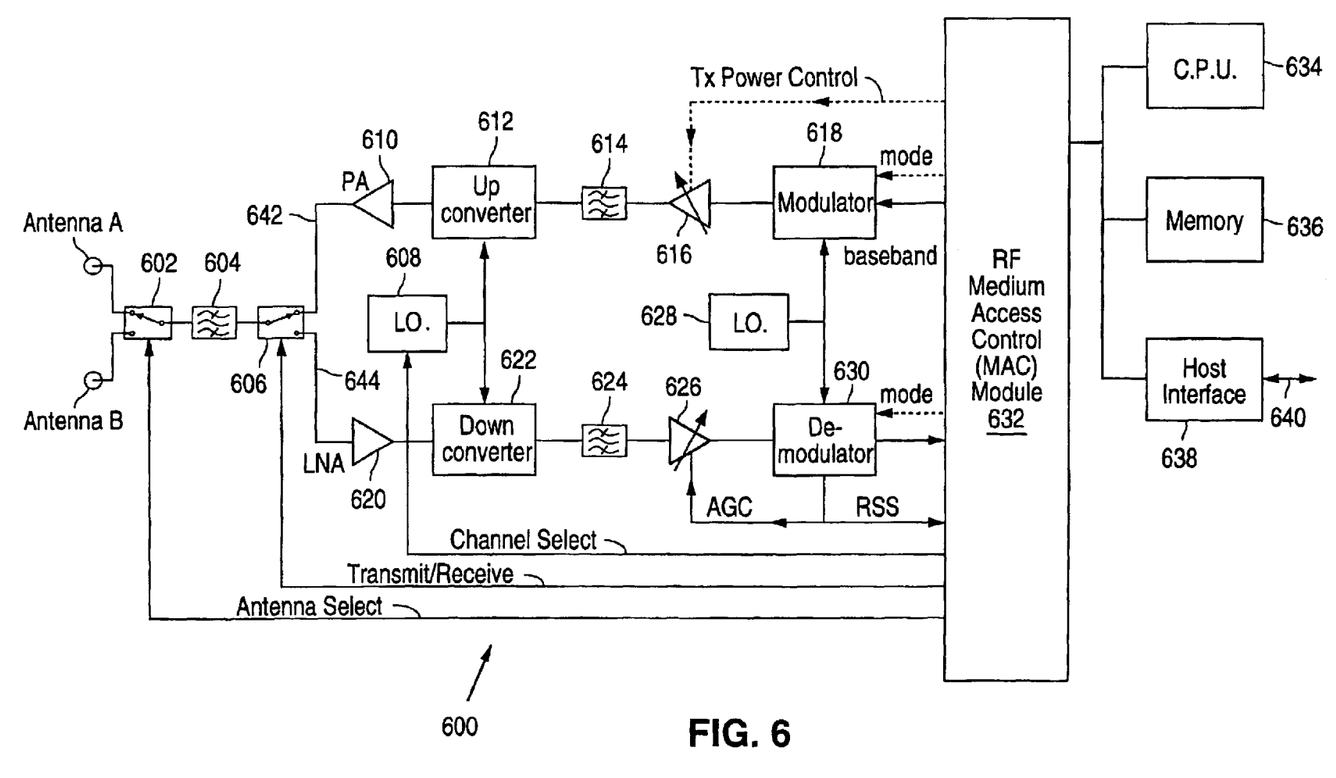
FIG. 6 shows an exemplary radio frequency transceiver in accordance with an embodiment of the present invention.

FIG. 6 shows an exemplary block diagram of a radio frequency transceiver 600 in accordance with an embodiment of the present invention. Transceiver 600 is suitable for every node, root and non-root or master and slave, in the network.

Transceiver 600 includes two antenna ports, identified as Antenna A and Antenna B. A medium access control (MAC) module 632, through an antenna select line, selects the desired antenna by use of an antenna switch 602. A bandpass filter 604 rejects any out-of-band signals and noise when transceiver 600 is in receive mode, and filters out spurious emissions generated by transceiver 600 when in transmit mode. MAC module 632, through a transmit/receive line, controls a transmit/receive (T/R) switch 606 to connect the selected antenna port to either a transmit path 642 or a receive path 644 of transceiver 600.

Receive path 644 includes a low noise amplifier (LNA) 620 followed by a downconverter 622 that downconverts the received signal to a fixed intermediate-frequency (IF) signal by mixing the received signal with a signal provided by a local oscillator (LO) 608. MAC module 632 controls the frequency of the signal provided by LO 608, allowing MAC module 632 to select among different receive channels. The IF signal is then filtered by a filter 624, amplified by a variable gain amplifier 626, and demodulated to baseband by a demodulator 630 that mixes the IF signal with a signal provided by a LO 628. If transceiver 600 is capable of multiple modulation modes, the demodulator mode of demodulator 630 must match that of the modulator in transceiver 600 of the transmitting node (not shown). MAC module 632 controls the demodulator mode through a mode line to demodulator 630.

Demodulator 630 can also measure the Received Signal Strength (RSS), which is provided to MAC module 632 through an RSS line. This RSS signal may also be used to provide a feedback signal to variable gain amplifier 626 for automatic gain control (AGC) of the amplification through an AGC line.

Transmit path 642 includes a modulator 618 that receives the baseband signal provided by MAC module 632 and uses it to modulate the carrier signal provided by LO 628. It should be understood that many forms of modulation exist and that the present invention does not depend on a specific modulation type or scheme. However, if transceiver 600 is capable of multiple modulation modes that trade-off link robustness for speed or data rate, then those modulation parameters can be specified by MAC module 632 on a message by message basis through a mode line. This allows optimization of the modulation modes for each specific link.

A variable gain amplifier 616 amplifies the modulated signal provided by modulator 618 under control of MAC module 632 through a transmitter (Tx) power control line. The modulated signal is then filtered by a filter 614, upconverted to the selected RF band by upconverter 612, and amplified by a power amplifier (PA) 610. MAC module 632 determines the transmit channel by selecting the frequency of the signal generated by LO 608 that is provided to upconverter 612.

Transceiver 600 also includes a central processor unit (CPU) 634 and a memory 636. A host interface 638 is provided with one or more ports 640 for interfacing with external host or subscriber equipment (not shown). For example, the interface may be connected to an Ethernet port or any other type of interface required, depending on the application and the requirements of the specific location. Thus, host interface 638 allows any location to connect also to another network (besides the wireless network), such as a local or wide area network or Internet.

MAC module 632 in transceiver 600 is shown as a separate module in FIG. 6. However, MAC module 632 may be combined with CPU 634 or MAC module 632 may be eliminated and its functions performed by CPU 634 through software programs. Alternatively, the functions of MAC module 632 may be performed using specific circuitry, such as an application specific integrated circuit (ASIC) or microcontroller, or may be performed using programmable circuitry, such as with programmable logic devices.

As discussed above in reference to FIG. 1, the overall network system is deployed in a tree structure. FIG. 1 shows an exemplary twelve-node network consisting of one root (location 1), three repeater nodes (locations 2, 5, and 6), and eight leaf nodes (locations 3, 4, and 7–12), with a leaf node defined as a location that acts only as a slave node. However, there is generally no restriction on the number and mix or combination of repeater nodes, leaf nodes, or levels in the tree structure. Other than the root node, all transceivers have one and only one "parent." Each of these transceivers is installed with a directional antenna connected to port A and pointing at the location of its parent. The transceivers at the root node and the repeater nodes are deployed with an antenna connected to port B. This antenna must have a radiation pattern to cover all of the transceiver's "children." Depending on the specific situation, this antenna may be directional, sector, or omnidirectional, and may also be polarized. The network can be deployed gradually, one node at a time, starting at the root. The only requirement is that when a new node is installed, the new node must be within RF range of its parent node. The network shown in FIG. 1 can continue to expand by adding more nodes as needed.

FIGS. 7–10 illustrate exemplary flowcharts of steps performed by nodes (e.g., the transceivers) in a network, such as illustrated in FIG. 1. For example, MAC module 632 of transceiver 600 may perform these software steps or, as explained above, CPU 634 or another device that is controlling transceiver 600 may perform one or more of these steps.

Figure 7:
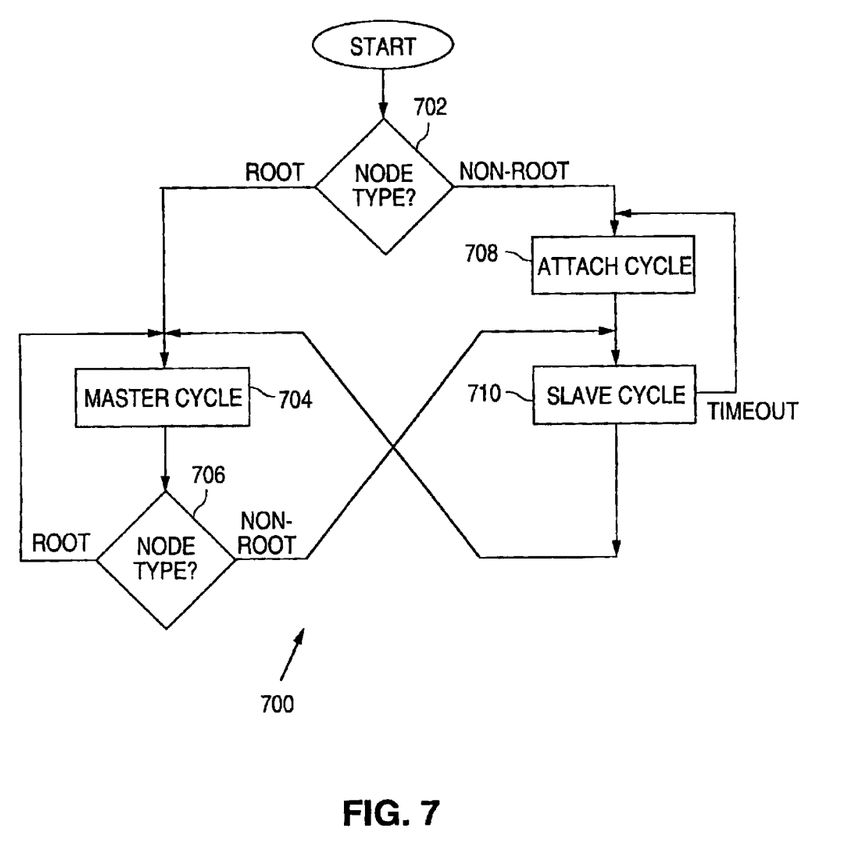
FIG. 7 shows a flowchart illustrating the top level cycles for a network station in accordance with an embodiment of the present invention.

FIG. 7 shows a flowchart 700 illustrating the top level cycles for a network station in accordance with an embodiment of the present invention. Flowchart 700 identifies the three major "cycles" of a node; "Master," "Attach," and "Slave" cycles. Upon power-up, step 702 determines the node type. As explained above, in each network one and only one node is configured as the "root" node. If the node is determined to be a root node, then the node executes repeatedly the "Master" cycle (at step 704), which is described in detail in reference to FIG. 8.

Figure 9:
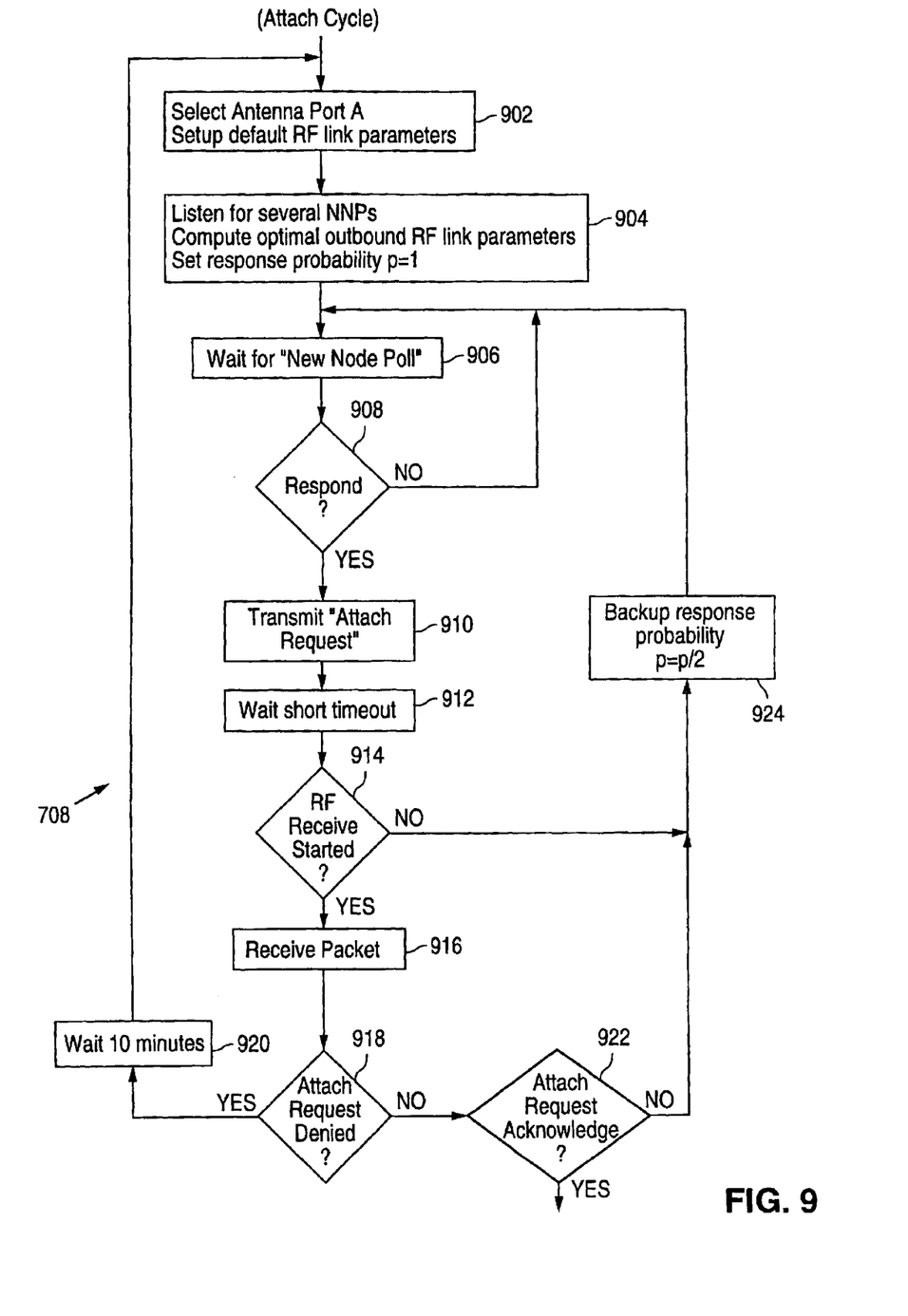
FIG. 9 shows a flowchart illustrating an attach cycle for a network station in accordance with an embodiment of the present invention.

If the node is not configured as the root (determined at step 702), the node first needs to become attached to the network by performing the "attach" cycle at step 708, which is described in detail in reference to FIG. 9. The new node, after attachment, performs the "Slave" cycle at step 710, which is described in detail in reference to FIG. 10. If the node is not polled by the master node after a certain timeout period, the node repeats the attach cycle. After performing a slave cycle, the node performs the "master" cycle (step 704) to provide service to its own children, or determine if any new nodes are attempting to attach to this node. After the master cycle, step 706 determines the node type, with the root node repeating the master cycle (at step 704) while the non-root nodes repeat the slave cycle (at step 710).

Figure 8:
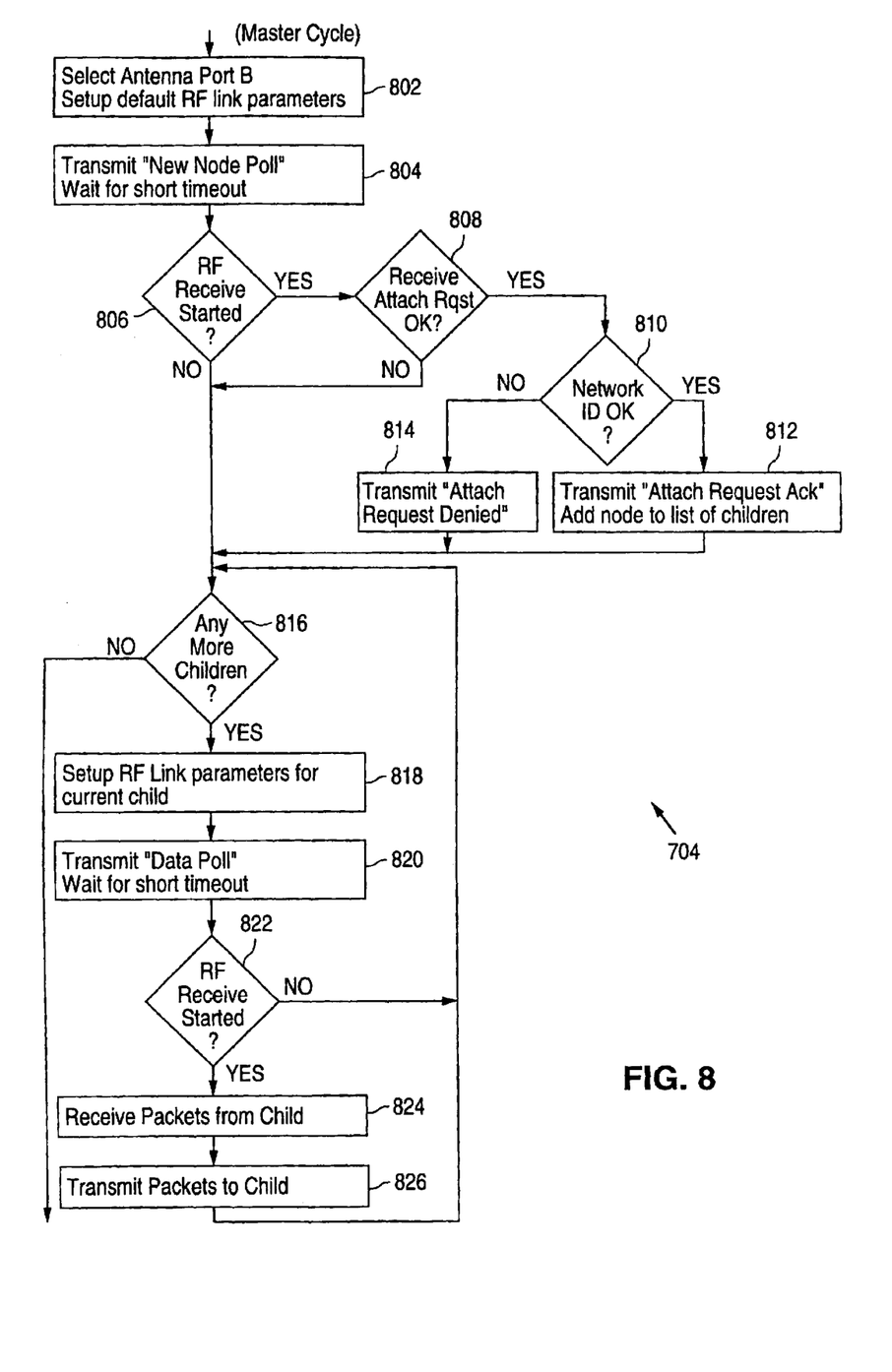
FIG. 8 shows a flowchart illustrating a master cycle for a network station in accordance with an embodiment of the present invention.

FIG. 8 shows step 704 of FIG. 7 in greater detail, illustrating an exemplary master cycle for a network station in accordance with an embodiment of the present invention. In general for the master cycle, a master node performs a "New Node Poll" to identify any new nodes that may desire to attach to the network, followed by servicing all its known children, one at a time. Specifically for the master cycle, step 802 selects antenna port B and sets up the transceiver to operate with the default RF link parameters. The NNP message is then transmitted by the master node, which then waits during the short timeout period (at step 804). Step 806 determines if a transmission is detected from a new node and, if so, step 808 determines if it is a valid attach request. If the network ID is valid (at step 810) for the attach request, then the master node transmits an ARA message and adds the new node to its list of children in its polling cycle (at step 812). If the network ID is not valid, the master node transmits an attach request denied message.

If no RF transmission is received (at step 806), the attach request is invalid (at step 808), or after transmitting the appropriate message (at step 812 or step 814), step 816 determines if any children need to be polled in the data polling cycle. If a child needs to be polled, then the RF link parameters are setup for this child (at step 818) and step 820 transmits the data poll message to the child. Step 822 determines if an RF transmission is received from the child and, if so, step 824 receives the transmitted inbound data (e.g., data packets) from the child and then step 826 transmits the outbound data (e.g., data packets) from the master node to the child. If no RF transmission is detected (at step 822) or after completing the polling of the current child, step 816 is then repeated. If no more children need to be polled, control returns to step 706 of FIG. 7.

FIG. 9 shows step 708 of FIG. 7 in greater detail, illustrating an exemplary attach cycle for a network station in accordance with an embodiment of the present invention. In general for the attach cycle, a slave node listens for the NNP message from an upstream node (i.e., a master node) that is already attached to the network. In response to the NNP message, the slave node transmits the "Attach Request" and receives the "Attach Request Acknowledge" message to become attached to the network. At the completion of the attach cycle, both the master node and the new node know about each other and the master node (i.e., parent) will start servicing this new node in the parent's normal polling cycle performed in master mode.

Specifically, the new node selects antenna port A and sets up the transceiver to operate with the default RF link parameters (at step 902). The new node then listens for several NNP messages from the desired parent and, at step 904, computes the optimal outbound RF link parameters and sets the response probability equal to one. The new node then waits for the next NNP message at step 906. Step 908 determines whether to respond after a NNP message (based on probability P) and, if not, then step 906 is repeated, but if the new node is to respond then the attach request message is transmitted (at step 910). A short timeout period is performed, at step 912, and then step 914 determines if an RF transmission is detected from the intended parent. If not, then the response probability is decremented by one-half and step 906 is repeated. If a transmission is received, step 916 receives the data transmission (e.g., one or more data packets) and step 918 determines whether the attach request is denied. If the attach request is denied, then step 920 waits a specified time period (e.g., ten minutes) prior to returning to step 902. If the attach request is accepted by the intended parent, step 922 verifies reception of the ARA message. If the ARA message is not received, then step 924 is repeated, but if the ARA message is received then control returns to step 710 of FIG. 7.

Figure 10:
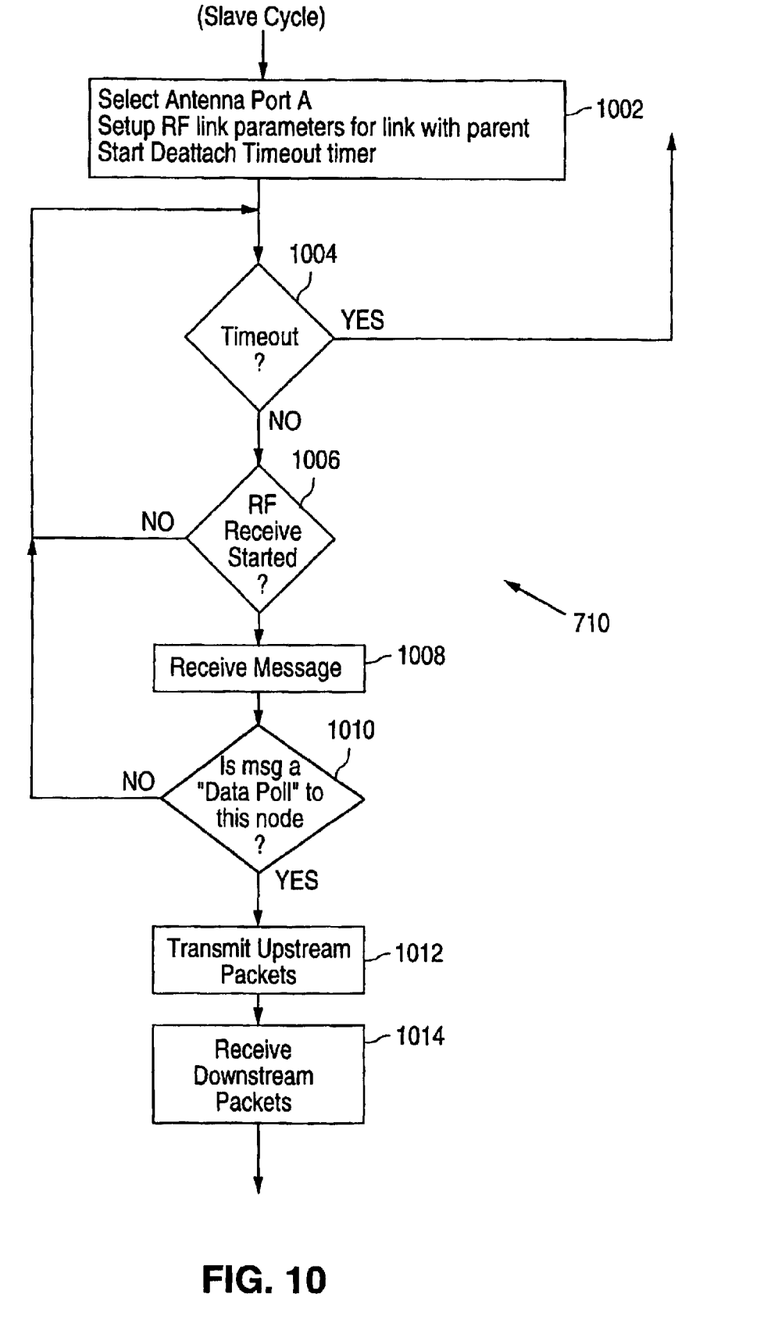
FIG. 10 shows a flowchart illustrating a slave cycle for a network station in accordance with an embodiment of the present invention.

FIG. 10 shows step 710 of FIG. 7 in greater detail, illustrating an exemplary slave cycle for a network station in accordance with an embodiment of the present invention. In general for the slave cycle, a slave node waits for the "Data Poll" message from its parent. After receiving the data poll message, the slave node transmits all of its upstream packets and then receives all of the downstream packets transmitted by its parent.

Specifically, step 1002 selects antenna port A for the slave node, sets up the transceiver to operate with the RF link parameters for establishing a communication link with the parent node, and starts the de-attach timeout timer. Step 1004 determines if the timeout period has expired, which indicates that the slave node has lost its established attachment with its parent, and if so, returns to step 708 of FIG. 7 to perform the attach cycle. If timeout has not occurred, step 1006 determines if an RF transmission is detected from the parent node. If the slave node is receiving a transmission, step 1008 receives the message and step 1010 determines if the message is a data poll message for this slave node. If no transmission is detected (at step 1006) or if the message is not designated for this slave node (at step 1010), then step 1004 is repeated. If the data poll message is for this slave node, then the slave node transmits its upstream data (e.g., data packets) at step 1012, receives its downstream data from the parent node at step 1014, and returns control to step 704 of FIG. 7.

Embodiments described above illustrate but do not limit the invention. It should also be understood that numerous modifications and variations are possible in accordance with the principles of the present invention. For example, exemplary medium access rates are employed for some embodiments, but the present invention is not limited to these rates and that many different data rates, link parameters, and modulation schemes may be utilized. Accordingly, the scope of the invention is defined only by the following claims.

We claim:

1. A wireless communications network comprising:
   a plurality of locations;
   a transceiver coupled to each of the locations and adapted to transmit or receive a radio frequency signal by selecting a channel from at least two non-conflicting channels, the transceiver further adapted to connect to two distinct antennas;
   wherein one of the locations is designated a root node and the other locations are designated as non-root nodes, with each non-root node within radio frequency range of either the root node or another non-root node and forming a tree structure originating at the root node and branching out from the root node to one or more of the non-root nodes, the locations not within radio frequency range of the root node communicating with the root node through non-root nodes that function as repeaters, with the repeaters designated as parents and the non-root nodes that communicate with the repeaters designated as children for each level of the tree structure;
   a broadbeam antenna coupled to the transceiver of the root node to transmit or receive wireless communications with the non-root nodes that are within radio frequency range of the root node; and
   a directional antenna coupled to the transceivers of the non-root nodes that are within radio frequency range of the root node to transmit or receive wireless communications with the root node.

2. The network of claim 1, further comprising:
   a broadbeam antenna connected to each transceiver of a parent to transmit or receive wireless communications with its children; and
   a directional antenna connected to each transceiver of a child to transmit or receive wireless communications with its parent.

3. The network of claim 2, wherein the broadbeam antennas further comprise an omnidirectional antenna or a sector antenna.

4. The network of claim 1, wherein the wireless communications flows either upstream towards the root node or downstream away from the root node relative to the tree structure.

5. The network of claim 1, wherein the broadbeam antenna or the directional antenna is polarized.

6. The network of claim 2, further comprising the addition of a new node by forming appropriate parent-child relationships with one of the locations.

7. The network of claim 1, wherein the wireless communications further comprise variable length packets.

8. The network of claim 1, wherein the wireless communications directed away from the root node utilize a first channel and the wireless communications directed towards the root node utilize a second channel that does not conflict with the first channel.

9. The network of claim 1, wherein each of the locations further comprises an interface couplable with another network.

10. The network of claim 6, further comprising a network identification that is identical for each of the transceivers and a source address that is unique for each of the transceivers in the wireless communications network.

11. The network of claim 1, wherein the transceiver further comprises a control module to execute a polling scheme for managing the wireless communications between the locations, the locations having a master-slave node relationship, with the master node upstream of the slave node that must communicate through the master node to transmit data upstream one level towards the root node in the tree structure, the polling scheme comprising:

transmitting, from the master node to the slave node, a poll message;

transmitting, from the slave node to the master node, inbound data or a poll acknowledge message; and transmitting, from the master node to the slave node, outbound data.

12. The network of claim 11, wherein a slave node, upon completion of the polling scheme with its master node, becomes a master node to poll its slave nodes prior to reverting back to being a slave node.

13. The network of claim 11, wherein the polling scheme further comprises switching to the next slave node and beginning the polling scheme immediately after a timeout period when the inbound data or the poll acknowledge message is not received from the current slave node.

14. The network of claim 11, wherein the poll message further comprises new RF link parameters to change the transmission parameters of the slave node or the poll acknowledge message further comprises new RF link parameters to change the transmission parameters of the master node.

15. The network of claim 11, wherein the control module further executes a new node polling scheme to incorporate a new location into the network, the new location within radio frequency range of the root node or a non-root node that functions as the master node to the new location, the new node polling scheme comprising:

transmitting, from the master node to the new location, a new node poll message;

transmitting, from the new location to the master node, an attach request message; and transmitting, from the master node to the new location, an attach request acknowledge message.

16. The network of claim 15, wherein the attach request message further comprises optimal radio frequency link parameters for transmissions from the master node to the new location, and the attach request acknowledge message further comprises optimal radio frequency link parameters for transmissions from the new location to the master node.

17. The network of claim 15, further comprising transmitting, from the master node to the new location, an attach request denied message, instead of the attach request acknowledge message, if the network ID transmitted from the new location is not valid.

18. The network of claim 11, wherein the control module further comprises:

a central processor unit; and a memory, connected to the central processor unit, that stores instructions for causing the central processor unit to execute the polling scheme.

19. A wireless communications network comprising:

a root node;

a broadbeam antenna coupled to the root node;

at least one non-root node;

a directional antenna coupled to each of the non-root nodes and directed at the broadbeam antenna of the root node to exchange wireless communications with the root node, wherein at least one of said non-root nodes functions as a repeater node, with the repeater node further having a broadbeam antenna;

at least one child node of the repeater node; and a directional antenna coupled to each of the child nodes of the repeater node and directed at the broadbeam antenna of the repeater node to exchange wireless communications with the repeater node, wherein the broadbeam antennas in the network are adapted to provide wireless communications with downstream nodes in the network and the directional antennas in the network are adapted to provide wireless communications with upstream nodes in the network.

20. The network of claim 19, wherein transmissions of the wireless communications to downstream nodes are adapted to use a first channel and the transmissions of the wireless communications to upstream nodes are adapted to use a second channel.

21. The network of claim 20, wherein the first channel and the second channel are separated in frequency, or by codes of a code division multiple access scheme.

22. The network of claim 19, wherein the wireless communications further comprises a downstream data poll message, followed by upstream data, followed by downstream data between respective nodes.

23. The network of claim 19, wherein the root node, the non-root nodes, and the child nodes each further comprises a transceiver adapted to provide half-duplex operation, the transceiver comprising:

a transmit path comprising a low noise amplifier, a downconverter, and a demodulator;

a receive path comprising a modulator, an upconverter, and an amplifier;

a control system connected to the transmit path and the receive path and adapted to provide a baseband signal to the transmit path and adapted to receive a baseband signal from the receive path, the control system determining frequencies of mixing signals provided to the downconverter, the demodulator, the modulator, and the upconverter;

a first switch adapted to connect to the transmit path or the receive path, the first switch controlled by the control system; and a second switch connected to the first switch and controlled by the control system, the second switch adapted to connect to the directional antenna or the broadbeam antenna.

24. The network of claim 19, wherein at least one of the root node, the non-root node, and the child node further comprises a host interface adapted to couple to a second network.

25. The network of claim 19, wherein the wireless communications network is self-synchronized, with the root node exchanging wireless communications with each of the non-root nodes in a consecutive polling fashion and each of the non-root nodes that function as repeaters polling their child nodes in a consecutive polling fashion immediately after the corresponding non-root node is polled by the root node.

26. The network of claim 19, wherein the network can be segmented into more than one network by designating one of the repeater nodes as a second root node and terminating the wireless communications between the repeater node and the root node.

27. A method of communicating in a wireless communications network, the network comprised of a root node and at least one repeater node and at least one leaf node which forms a tree structure having a master-slave relationship at each level of the tree structure, the root node having an antenna for wireless communication with its slaves, the repeater nodes and the leaf nodes each having only one master and having a directional antenna pointed at the respective master, the repeater nodes having an additional antenna for wireless communication with their slaves for when the repeater nodes are functioning as masters, the method performed by each root, repeater, and leaf node comprising:

determining the node type;

performing a master cycle repeatedly if the node is the root node;

performing an attach cycle if unattached or becomes detached from the network and if the node is not the root node; and performing a slave cycle followed the master cycle repeatedly, if the node is not the root node.

28. The method of claim 27, wherein the master cycle further comprises:

transmitting from the master a new node poll;

transmitting from the master an attach request acknowledge if a valid attach request is received from a new slave;

transmitting to a slave a data poll message; and receiving data or a message from the slave.

29. The method of claim 28, wherein the master cycle further comprises transmitting from the master an attach request denied if an invalid network identification is received from a new slave.

30. The method of claim 28, further comprising transmitting data or a message to the slave.

31. The method of claim 27, wherein the attach cycle further comprises:

receiving a new node poll message from a master attached to the network;

transmitting to the master an attach request message; and receiving an attach request acknowledge from the master.

32. The method of claim 31, wherein the attach request message further comprises optimal radio frequency link parameters for transmission from the master to the slave.

33. The method of claim 31, further comprising setting a response probability equal to one and decreasing by one-half for each failed attach request message.

34. The method of claim 27, wherein the slave cycle further comprises:

receiving a data poll message from the master;

transmitting data to the master; and receiving data from the master.

* * * * *